US007866835B2

(12) United States Patent  
Liu

(10) Patent No.: US 7,866,835 B2  
(45) Date of Patent: Jan. 11, 2011

(54) AUXILIARY MIRROR ASSEMBLY FOR SIDEVIEW MIRROR OF CAR

(76) Inventor: Chin-Shu Liu, 105, Yilin 1$^{st}$ St., Rende Township, Tainan County (TW)

( * ) Notice: Subject to any disclaimer, the term of this patent is extended or adjusted under 35 U.S.C. 154(b) by 79 days.

(21) Appl. No.: 12/423,167

(22) Filed: Apr. 14, 2009

(65) Prior Publication Data

US 2010/0259842 A1 Oct. 14, 2010

(51) Int. Cl.
*B60R 1/08* (2006.01)
(52) U.S. Cl. .................................. 359/844; 248/475.1
(58) Field of Classification Search ................ 359/838, 359/842, 844, 871, 872, 875, 881; 248/475.1–480; 403/85, 120
See application file for complete search history.

(56) References Cited

U.S. PATENT DOCUMENTS

| | | | | |
|---|---|---|---|---|
| 4,892,400 A | * | 1/1990 | Brookes et al. | 359/865 |
| 5,028,029 A | * | 7/1991 | Beck et al. | 248/479 |
| 5,096,283 A | * | 3/1992 | Croteau | 359/865 |
| 6,988,810 B2 | * | 1/2006 | Chen | 359/871 |
| 7,628,498 B1 | * | 12/2009 | Huang | 359/871 |
| 2005/0013024 A1 | * | 1/2005 | Lang et al. | 359/879 |
| 2005/0052765 A1 | * | 3/2005 | Lang et al. | 359/879 |
| 2007/0019312 A1 | * | 1/2007 | Hu | 359/871 |

FOREIGN PATENT DOCUMENTS

DE 3328432 A * 2/1985

* cited by examiner

*Primary Examiner*—Mark Consilvio  
(74) *Attorney, Agent, or Firm*—Alan Kamrath; Kamrath & Associates PA

(57) ABSTRACT

An auxiliary mirror assembly for the sideview mirror of a car includes an auxiliary sideview mirror, an elongate hollow support post mounted on the auxiliary sideview mirror, two mounting brackets mounted on the support post, and two locking members each pivotally mounted on the support post and each releasably locked onto a respective mounting bracket to releasably lock the respective mounting bracket onto the support post. Each of the mounting brackets includes an adjusting member adjustably mounted on the support post and a clamping member pivotally connected with the adjusting member. The adjusting member of each of the mounting brackets has a serrated portion. Each of the locking members has a toothed portion detachably engaged with the serrated portion of the respective mounting bracket.

14 Claims, 6 Drawing Sheets

AUXILIARY MIRROR ASSEMBLY FOR SIDEVIEW MIRROR OF CAR

BACKGROUND OF THE INVENTION

1. Field of the Invention

The present invention relates to an auxiliary mirror assembly and, more particularly, to an auxiliary mirror assembly for the sideview mirror of a wheeled vehicle, such as a car and the like.

2. Description of the Related Art

A sideview mirror is mounted on a side of a car to provide a side-viewing effect to a driver in the car to protect the driver's safety. However, the angle of the sideview mirror is usually designed to fit the size of the car, so that when a trailer is attached to the car, the driver in the car cannot clearly see the trailer behind the car, thereby easily causing danger to the driver. A conventional auxiliary mirror assembly for the sideview mirror of a car comprises an auxiliary sideview mirror, a support post mounted on the auxiliary sideview mirror, two mounting brackets adjustably mounted on the support post, and two fastening bolts each extending through the respective mounting bracket and the support post to lock the respective mounting bracket onto the support post. The support post is provided with two guide slots to allow passage and guide movement of the two fastening bolts. Thus, when the two mounting brackets are unlocked from the two fastening bolts, the two mounting brackets are moved on the support post to adjust the distance between the two mounting brackets so that the two mounting brackets can be mounted on a sideview mirror to attach the auxiliary mirror assembly to the sideview mirror.

BRIEF SUMMARY OF THE INVENTION

In accordance with the present invention, there is provided an auxiliary mirror assembly, comprising an auxiliary sideview mirror, an elongate hollow support post mounted on the auxiliary sideview mirror, two mounting brackets adjustably mounted on the support post, and two locking members each pivotally mounted on the support post and each releasably locked onto a respective one of the two mounting brackets to releasably lock the respective mounting bracket onto the support post. Each of the mounting brackets includes an adjusting member adjustably mounted on the support post and a clamping member pivotally connected with the adjusting member. The adjusting member of each of the mounting brackets has a peripheral wall provided with a serrated portion. Each of the two locking members has an inner face provided with a toothed portion detachably engaged with the serrated portion of a respective one of the mounting brackets.

The primary objective of the present invention is to provide an auxiliary mirror assembly, wherein the guide rod can guide the movement of the adjusting member of each of the mounting brackets so that the adjusting member of each of the mounting brackets is moved in the slideway of the support post smoothly and stably.

Another objective of the present invention is to provide an auxiliary mirror assembly, wherein the limit flange of each of the mounting brackets is guided in the guide channel of the support post to guide movement of the adjusting member of each of the mounting brackets and to prevent the adjusting member of each of the mounting brackets from being rotated relative to the support post.

A further objective of the present invention is to provide an auxiliary mirror assembly, wherein the limit flange of each of the mounting brackets is moved to abut the respective limit screw to prevent the adjusting member of each of the mounting brackets from being detached from the support post.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
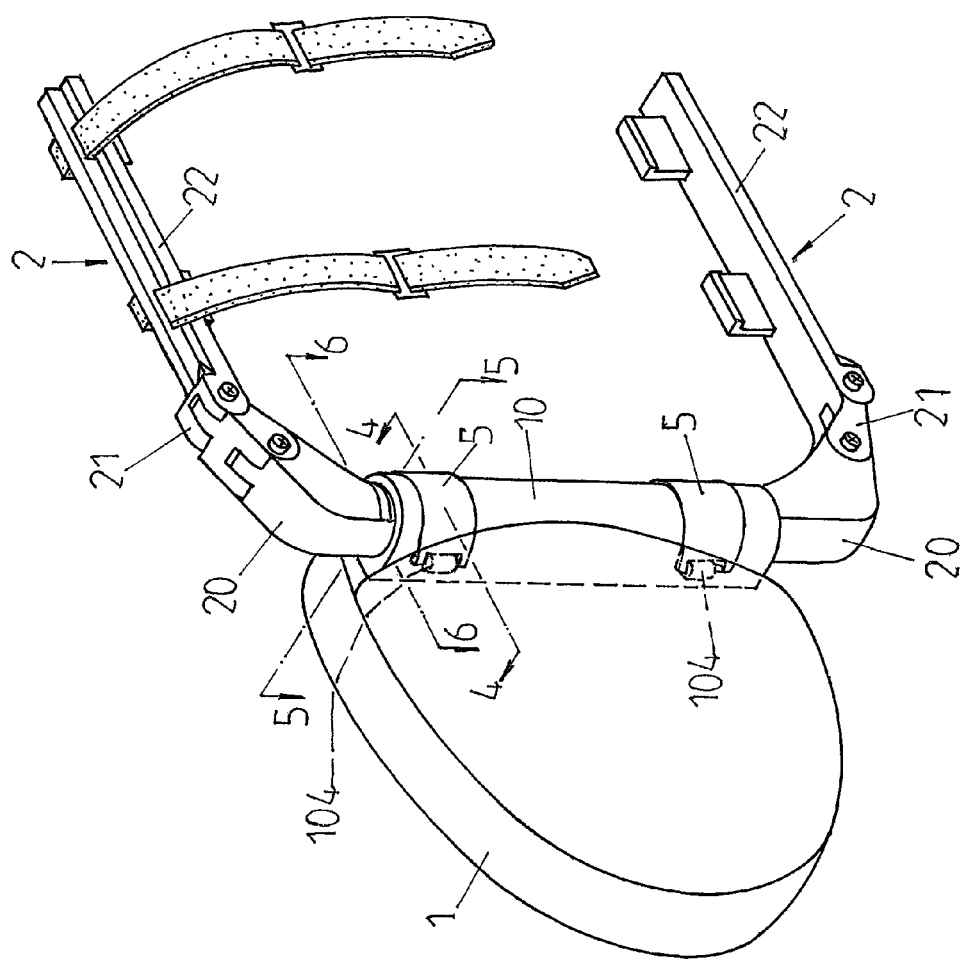
FIG. 1 is a perspective view of an auxiliary mirror assembly in accordance with the preferred embodiment of the present invention.

Referring to the drawings and initially to FIGS. 1-6, an auxiliary mirror assembly for the sideview mirror of a car in accordance with the preferred embodiment of the present invention comprises an auxiliary sideview mirror 1, an elongate hollow support post 10 mounted on the auxiliary sideview mirror 1, two mounting brackets 2 adjustably mounted on the support post 10, and two locking members 5 each pivotally mounted on the support post 10 and each releasably locked onto a respective one of the two mounting brackets 2 to releasably lock the respective mounting bracket 2 onto the support post 10.

The support post 10 has an inner portion provided with an elongate slideway 101. The inner portion of the support post 10 has a side provided with an elongate guide channel 102 connected to the slideway 101. The support post 10 has a peripheral wall provided with a receiving opening 103 connected to the slideway 101 to receive a respective one of the two locking members 5. The receiving opening 103 of the support post 10 has a first side provided with a pivot ear 104 and a second side provided with a locking rib 105. The second side of the support post 10 is provided with two positioning blocks 106 and two positioning grooves 109 each located between the locking rib 105 and a respective one of the two positioning blocks 106.

The auxiliary sideview mirror 1 has a side provided with two screw bores 108 each connected to the guide channel 102 of the support post 10 and a through hole 107 connected to the guide channel 102 of the support post 10. The through hole 107 of the auxiliary sideview mirror 1 is located between the two screw bores 108.

The auxiliary mirror assembly further comprises a guide rod 4 secured in the slideway 101 of the support post 10, a locking screw 6 extending through the auxiliary sideview mirror 1 and the guide rod 4 to secure the guide rod 4 in the slideway 101 of the support post 10, and two limit screws 7 each extending through the auxiliary sideview mirror 1 and each extending into the guide channel 102 of the support post 10. The guide rod 4 is provided with a screw hole 41. The locking screw 6 extends through the through hole 107 of the auxiliary sideview mirror 1 and the guide channel 102 of the support post 10 and is screwed into the screw hole 41 of the guide rod 4. Each of the two limit screws 7 is screwed into a respective one of the two screw bores 108 of the auxiliary sideview mirror 1.

Each of the mounting brackets 2 includes an adjusting member 20 adjustably mounted on the support post 10 and a clamping member 22 pivotally connected with the adjusting member 20 by a connector 21. The adjusting member 20 of each of the mounting brackets 2 is movable in the slideway 101 of the support post 10 and has an inner portion provided with a receiving hole 201 to receive the guide rod 4. The adjusting member 20 of each of the mounting brackets 2 has a peripheral wall provided with a serrated portion 202 aligning with the receiving opening 103 of the support post 10. The adjusting member 20 of each of the mounting brackets 2 has a side provided with a protruding limit flange 203 slidable in the guide channel 102 of the support post 10 to prevent the adjusting member 20 of each of the mounting brackets 2 from being rotatable relative to the support post 10. The limit flange 203 of each of the mounting brackets 2 is movable between the locking screw 6 and a respective one of the two limit screws 7. The limit flange 203 of each of the mounting brackets 2 is movable relative to the support post 10 to abut the respective limit screw 7 to prevent the adjusting member 20 of each of the mounting brackets 2 from being detachable from the support post 10.

Each of the two locking members 5 has an inner face provided with a toothed portion 54 detachably engaged with the serrated portion 202 of a respective one of the mounting brackets 2. Each of the two locking members 5 has a first side provided with a pivot slot 51 pivotally mounted on the pivot ear 104 of the support post 10 and a second side provided with a locking hole 52 detachably locked onto the locking rib 105. The locking hole 52 of each of the two locking members 5 has two opposite ends each provided with a positioning boss 53 positioned in a respective one of the two positioning grooves 109 of the support post 10 and each limited by the locking rib 105 and a respective one of the two positioning blocks 106 of the support post 10.

Figure 2:
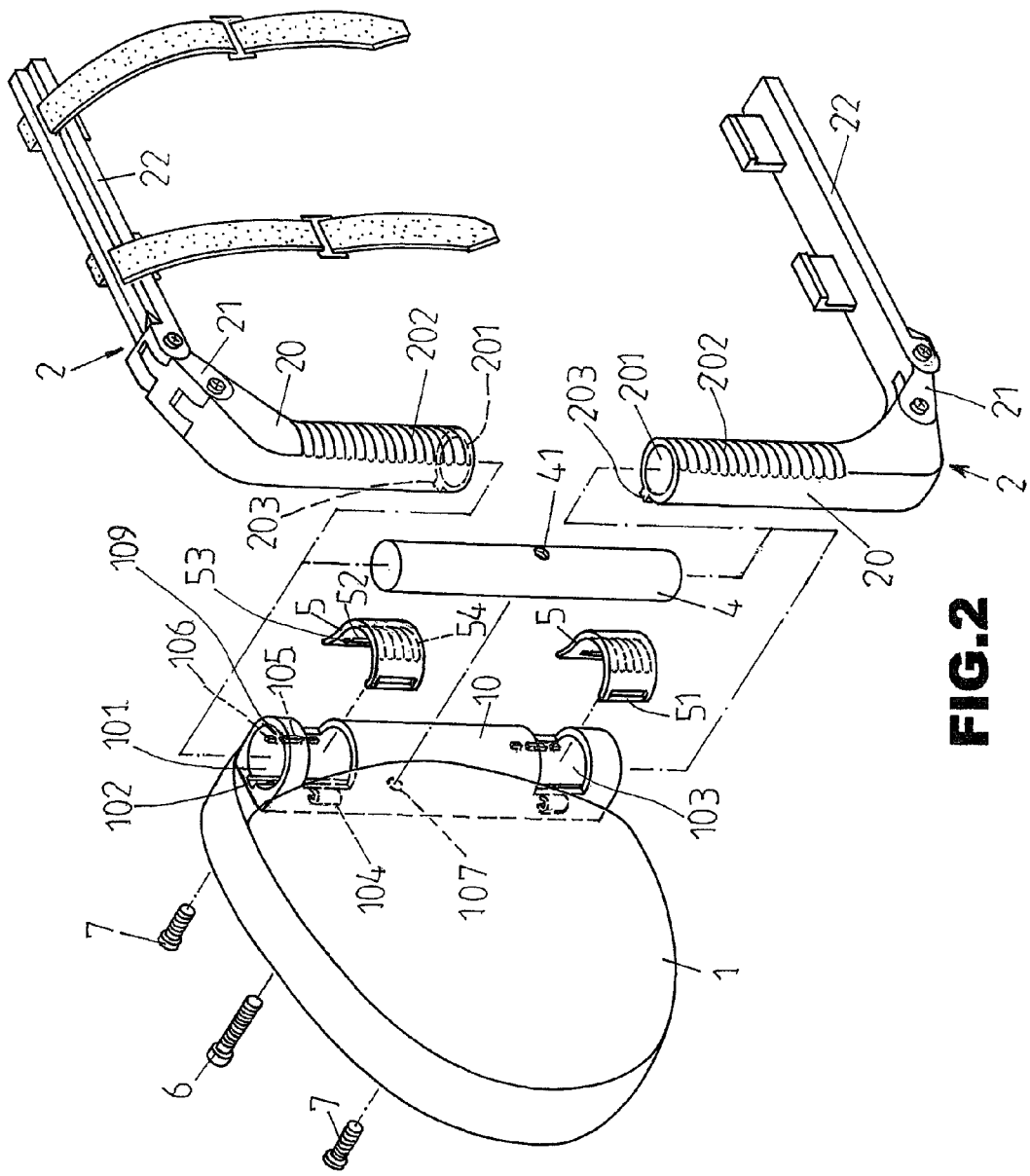
FIG. 2 is an exploded perspective view of the auxiliary mirror assembly as shown in FIG. 1.
Figure 3:
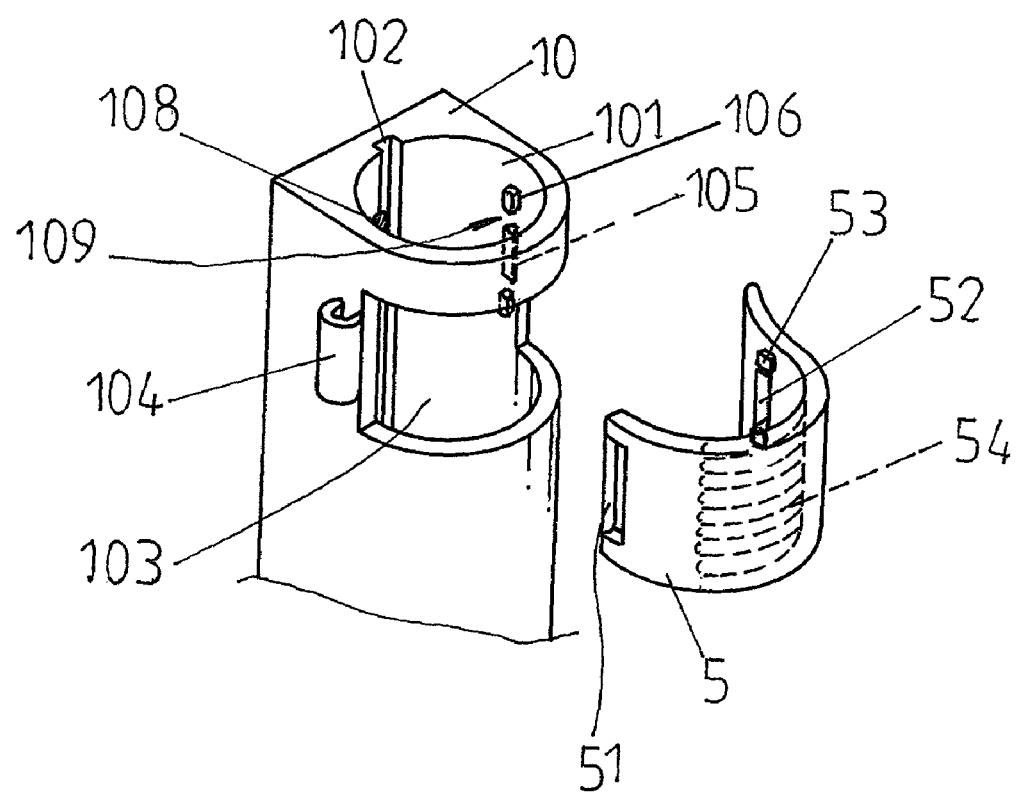
FIG. 3 is a partially exploded perspective view of the auxiliary mirror assembly as shown in FIG. 2.
Figure 5:
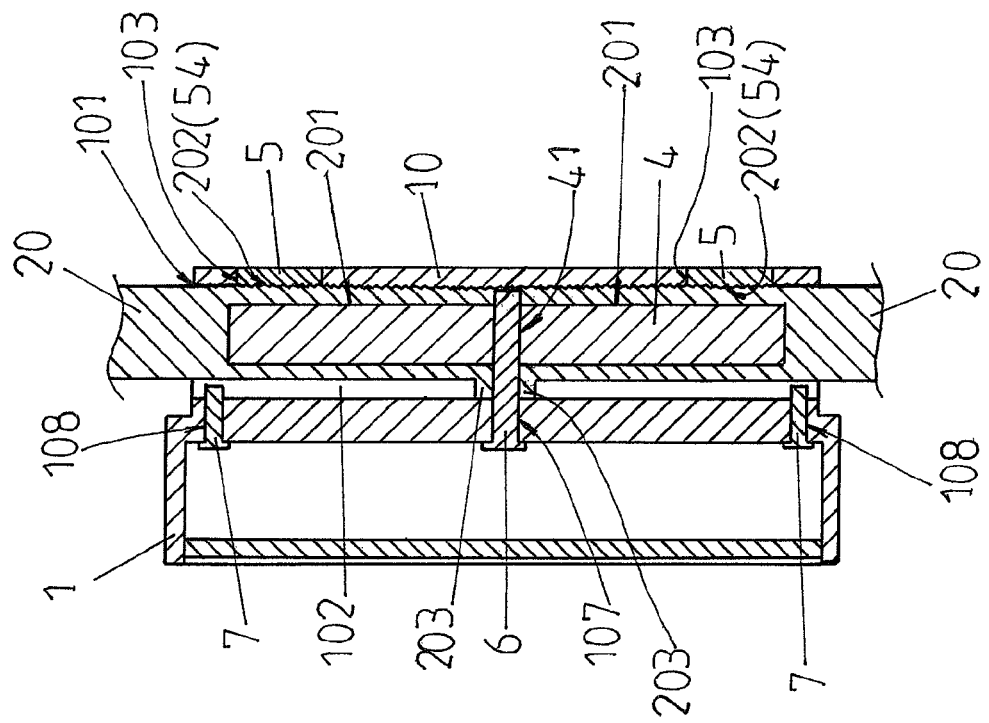
FIG. 5 is a cross-sectional view of the auxiliary mirror assembly taken along line 5-5 as shown in FIG. 1.
Figure 4:
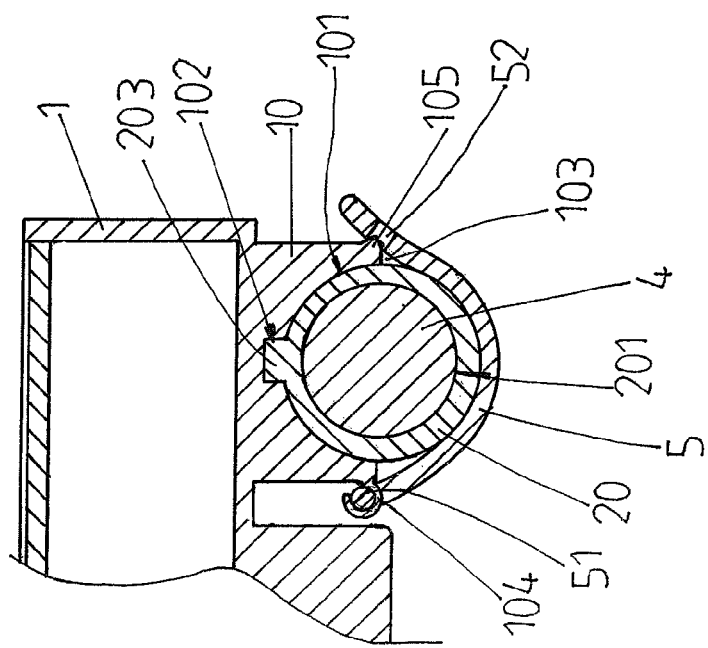
FIG. 4 is a cross-sectional view of the auxiliary mirror assembly taken along line 4-4 as shown in FIG. 1.
Figure 6:
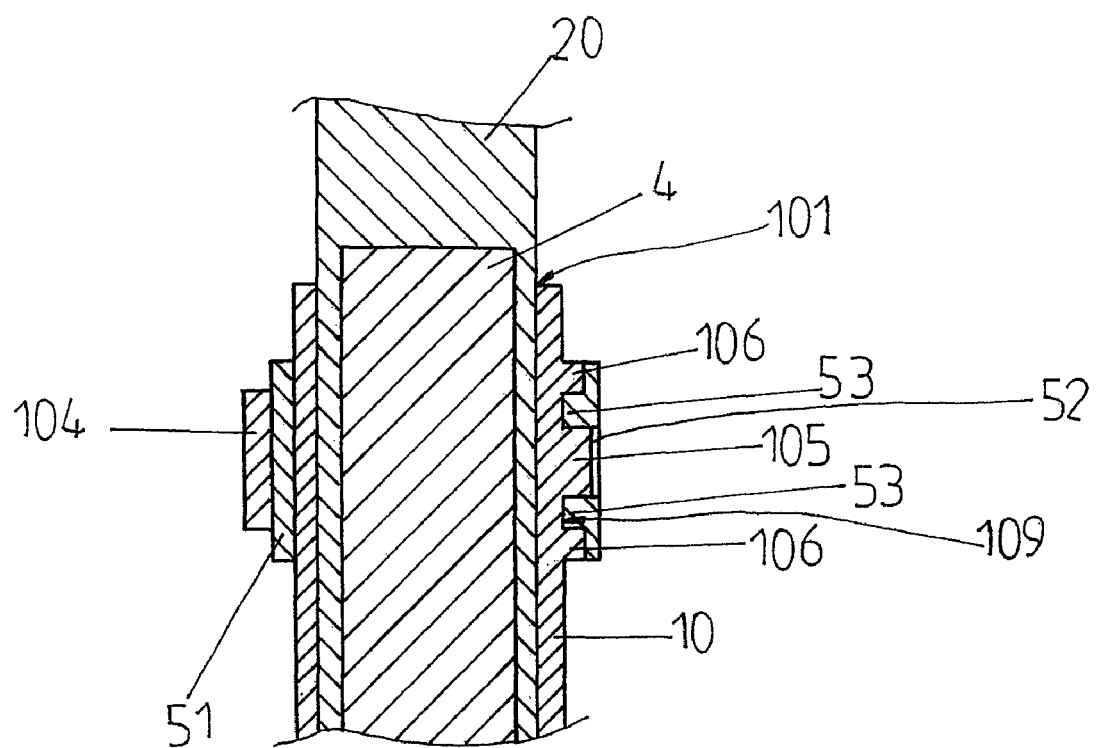
FIG. 6 is a cross-sectional view of the auxiliary mirror assembly taken along line 6-6 as shown in FIG. 1.

In operation, referring to FIGS. 4-8 with reference to FIGS. 1-3, when each of the two locking members 5 is locked onto the support post 10 as shown in FIG. 4, the toothed portion 54 of each of the two locking members 5 is engaged with the serrated portion 202 of a respective one of the mounting brackets 2 as shown in FIG. 5 so that the adjusting member 20 of each of the mounting brackets 2 is locked onto the support post 10 by each of the two locking members 5.

Figure 8:
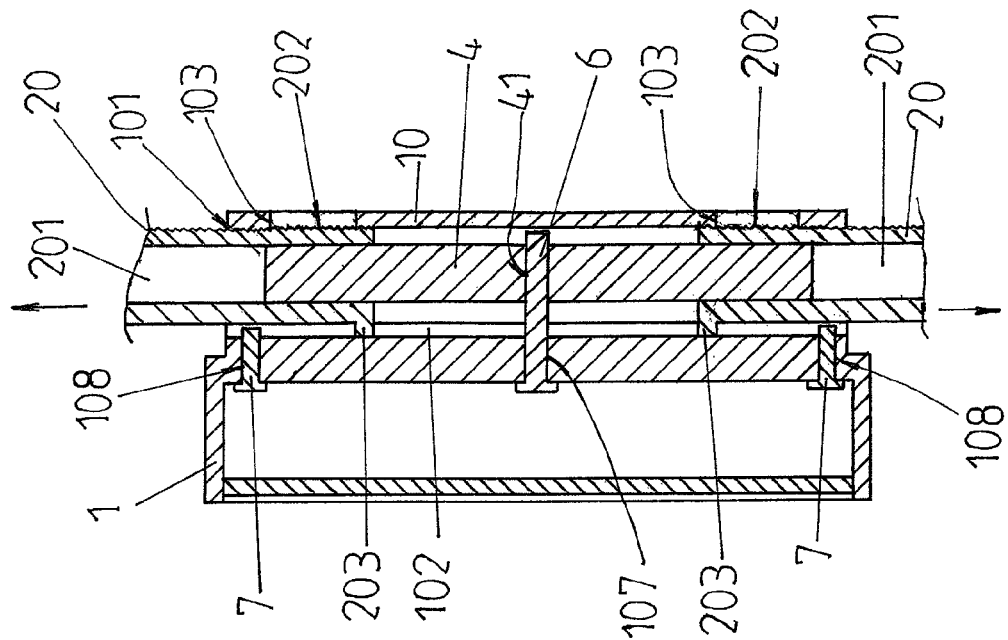
FIG. 8 is a schematic operational view of the auxiliary mirror assembly as shown in FIG. 5.
Figure 7:
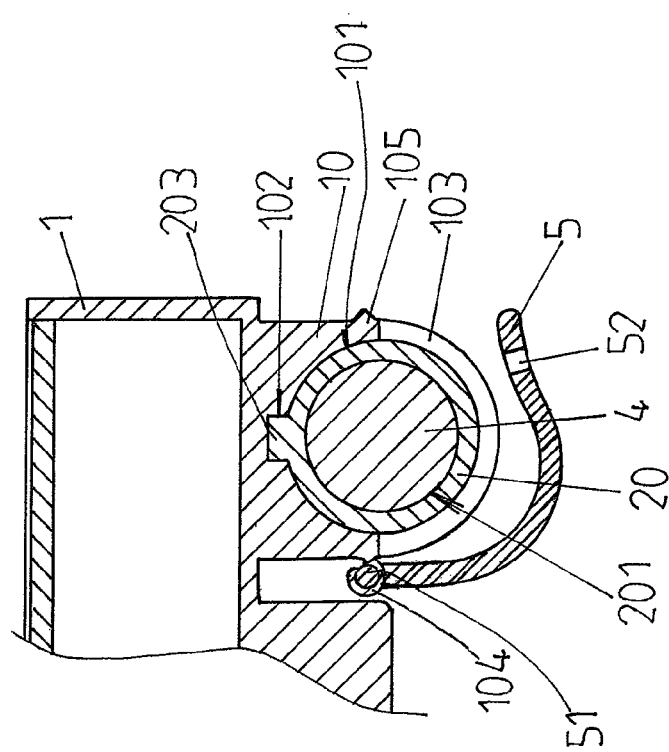
FIG. 7 is a schematic operational view of the auxiliary mirror assembly as shown in FIG. 4.

On the contrary, when each of the two locking members 5 is removed from the support post 10 as shown in FIG. 7, the toothed portion 54 of each of the two locking members 5 is disengaged from the serrated portion 202 of the respective mounting bracket 2 so that the adjusting member 20 of each of the mounting brackets 2 is unlocked from the respective locking member 5 and is movable in the slideway 101 of the support post 10 as shown in FIG. 8 to adjust the distance between the clamping members 22 of the mounting brackets 2. Thus, when the mounting brackets 2 are mounted on a sideview mirror (not shown), the distance between the clamping members 22 of the mounting brackets 2 are adjusted freely to fit the size of the sideview mirror.

At this time, the guide rod 4 can guide movement of the adjusting member 20 of each of the mounting brackets 2. In addition, the limit flange 203 of each of the mounting brackets 2 is moved and guided in the guide channel 102 of the support post 10 to guide movement of the adjusting member 20 of each of the mounting brackets 2 and to prevent the adjusting member 20 of each of the mounting brackets 2 from being rotatable relative to the support post 10. In addition, the limit flange 203 of each of the mounting brackets 2 is movable relative to the support post 10 to abut the respective limit screw 7 to prevent the adjusting member 20 of each of the mounting brackets 2 from being detachable from the support post 10.

Accordingly, the guide rod 4 can guide movement of the adjusting member 20 of each of the mounting brackets 2 so that the adjusting member 20 of each of the mounting brackets 2 is moved in the slideway 101 of the support post 10 smoothly and stably. In addition, the limit flange 203 of each of the mounting brackets 2 is guided in the guide channel 102 of the support post 10 to guide movement of the adjusting member 20 of each of the mounting brackets 2 and to prevent the adjusting member 20 of each of the mounting brackets 2 from being rotated relative to the support post 10. Further, the limit flange 203 of each of the mounting brackets 2 is moved to abut the respective limit screw 7 to prevent the adjusting member 20 of each of the mounting brackets 2 from being detached from the support post 10.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. An auxiliary mirror assembly, comprising:
an auxiliary sideview mirror;
an elongate hollow support post mounted on the auxiliary sideview mirror;
two mounting brackets adjustably mounted on the support post;
two locking members each pivotally mounted on the support post and each releasably locked onto a respective one of the two mounting brackets to releasably lock the respective mounting bracket onto the support post;
wherein each of the mounting brackets includes an adjusting member adjustably mounted on the support post and a clamping member pivotally connected with the adjusting member;
the adjusting member of each of the mounting brackets has a peripheral wall provided with a serrated portion;
each of the two locking members has an inner face provided with a toothed portion detachably engaged with the serrated portion of a respective one of the mounting brackets.

2. The auxiliary mirror assembly of claim 1, wherein
the support post has an inner portion provided with an elongate slideway;
the adjusting member of each of the mounting brackets is movable in the slideway of the support post.

3. The auxiliary mirror assembly of claim 2, wherein
the inner portion of the support post has a side provided with an elongate guide channel connected to the slideway;
the adjusting member of each of the mounting brackets has a side provided with a protruding limit flange slidable in the guide channel of the support post to prevent the adjusting member of each of the mounting brackets from being rotatable relative to the support post.

4. The auxiliary mirror assembly of claim 3, wherein the support post has a peripheral wall provided with a receiving opening connected to the slideway to receive a respective one of the two locking members.

5. The auxiliary mirror assembly of claim 4, wherein the serrated portion of each of the mounting brackets aligns with the receiving opening of the support post.

6. The auxiliary mirror assembly of claim 4, wherein
the receiving opening of the support post has a first side provided with a pivot ear and a second side provided with a locking rib;
each of the two locking members has a first side provided with a pivot slot pivotally mounted on the pivot ear of the support post and a second side provided with a locking hole detachably locked onto the locking rib.

7. The auxiliary mirror assembly of claim 6, wherein
the second side of the support post is provided with two positioning blocks and two positioning grooves each located between the locking rib and a respective one of the two positioning blocks;
the locking hole of each of the two locking members has two opposite ends each provided with a positioning boss positioned in a respective one of the two positioning grooves of the support post and each limited by the locking rib and a respective one of the two positioning blocks of the support post.

8. The auxiliary mirror assembly of claim 3, further comprising:
a guide rod secured in the slideway of the support post;
a locking screw extending through the auxiliary sideview mirror and the guide rod to secure the guide rod in the slideway of the support post.

9. The auxiliary mirror assembly of claim 8, wherein the auxiliary sideview mirror has a side provided with a through hole connected to the guide channel of the support post;
the guide rod is provided with a screw hole;
the locking screw extends through the through hole of the auxiliary sideview mirror and the guide channel of the support post and is screwed into the screw hole of the guide rod.

10. The auxiliary mirror assembly of claim 8, further comprising:
two limit screws each extending through the auxiliary sideview mirror and each extending into the guide channel of the support post.

11. The auxiliary mirror assembly of claim 10, wherein the limit flange of each of the mounting brackets is movable between the locking screw and a respective one of the two limit screws.

12. The auxiliary mirror assembly of claim 10, wherein the limit flange of each of the mounting brackets is movable relative to the support post to abut the respective limit screw to prevent the adjusting member of each of the mounting brackets from being detachable from the support post.

13. The auxiliary mirror assembly of claim 10, wherein
the auxiliary sideview mirror has a side provided with two screw bores each connected to the guide channel of the support post;
each of the two limit screws is screwed into a respective one of the two screw bores of the auxiliary sideview mirror.

14. The auxiliary mirror assembly of claim 8, wherein the adjusting member of each of the mounting brackets has an inner portion provided with a receiving hole to receive the guide rod.

* * * * *